(12) United States Patent
Al Sheikh et al.

(10) Patent No.: US 12,229,568 B2
(45) Date of Patent: *Feb. 18, 2025

(54) METHODS AND CIRCUITRY FOR EFFICIENT MANAGEMENT OF LOCAL BRANCH HISTORY REGISTERS

(71) Applicant: Microsoft Technology Licensing, LLC, Redmond, WA (US)

(72) Inventors: Rami Mohammad Al Sheikh, Morrisville, NC (US); Ahmed Helmi Mahmoud Osman Abulila, Raleigh, NC (US); Daren Eugene Streett, Cary, NC (US); Michael Scott McIlvaine, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,418

(22) Filed: Aug. 4, 2023

(65) Prior Publication Data
US 2023/0393854 A1 Dec. 7, 2023

Related U.S. Application Data

(63) Continuation of application No. 17/831,116, filed on Jun. 2, 2022, now Pat. No. 11,768,688.

(51) Int. Cl.
*G06F 9/30* (2018.01)
*G06F 9/38* (2018.01)

(52) U.S. Cl.
CPC ........ *G06F 9/3861* (2013.01); *G06F 9/30101* (2013.01); *G06F 9/3804* (2013.01); *G06F 9/3844* (2013.01); *G06F 9/3806* (2013.01)

(58) Field of Classification Search
CPC .. G06F 9/3861; G06F 9/30101; G06F 9/3804; G06F 9/3844; G06F 9/3806
See application file for complete search history.

(56) References Cited

U.S. PATENT DOCUMENTS

2016/0350116 A1   12/2016  Reddy et al.
2022/0113976 A1   4/2022  Kothinti Naresh et al.

OTHER PUBLICATIONS

"International Search Report and Written Opinion Issued in PCT Application No. PCT/US23/018770", Mailed Date: Aug. 4, 2023, 10 Pages.

*Primary Examiner* — Corey S Faherty
(74) *Attorney, Agent, or Firm* — Ranjeev Singh; Singh Law, PLLC

(57) ABSTRACT

Methods and circuitry for efficient management of local branch history registers are described. An example processor includes a pipeline comprising a plurality of stages and a bit-vector associated with each of in-flight branches associated with the pipeline. The processor includes a recovery counter for tracking a number of bits needing recovery before a local branch history register is valid for participation in branch prediction. The processor includes branch predictor circuitry configured to, in response to an update of a local branch history register by a branch, set a bit in a corresponding bit-vector indicative of the update of the local branch history register. The branch predictor circuitry is configured to, upon a flush, determine a value indicative of an extent of recovery required for each local branch history register affected by the flush, and set a corresponding recovery counter to the value indicative of the extent of recovery required.

20 Claims, 11 Drawing Sheets

METHODS AND CIRCUITRY FOR EFFICIENT MANAGEMENT OF LOCAL BRANCH HISTORY REGISTERS

CROSS-REFERENCE TO RELATED APPLICATION(S)

This application is a continuation of U.S. patent application Ser. No. 17/831,116, filed on Jun. 2, 2022, entitled "METHODS AND CIRCUITRY FOR EFFICIENT MANAGEMENT OF LOCAL BRANCH HISTORY REGISTERS," the entire contents of which are hereby incorporated herein by reference.

BACKGROUND

A multi-threaded processor may fetch the instructions belonging to a thread and execute them. While executing instructions for a thread, the processor may execute an instruction that refers to a register or a memory location. Because of the delay associated with the access to the referenced memory location, the processor may have to wait until the referenced memory location is accessed. Similarly, if an instruction takes multiple cycles to execute, a subsequent instruction that depends on it will have to wait. In order to maintain efficiency, the processor may fetch instructions from a different thread and start executing them. This way, the processor may execute instructions more efficiently. This type of parallelism may be referred to as thread level parallelism. Another way to improve the processor's performance is the use of instruction level parallelism.

Speculative instruction fetching supplies the instructions needed to extract the instruction level parallelism of a program. Successful speculation of next instructions to fetch may depend on a branch predictor's analysis of the program history. Such predictions may turn out to be inaccurate and the processor may have to recover from the mispredicted branch, including having to discard the results of the incorrectly predicted dependences of the instructions, and re-execute the instructions in the correct order. The recovery from the mispredicted branch may be suboptimal.

SUMMARY

In one example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a branch, set a bit in a corresponding bit-vector indicative of the update of the local branch history register by the branch. The branch predictor circuitry may further be configured to upon a flush, determine a value indicative of an extent of recovery required for each local branch history register affected by the flush, and set a corresponding recovery counter to the value indicative of the extent of recovery required.

In another example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a branch, set a bit in a corresponding bit-vector indicative of the update of the local branch history register by the branch. The branch predictor circuitry may further be configured to upon a flush, identify all local branch history registers requiring recovery by performing a logical OR operation on bit-vectors corresponding to a mis-speculated branch and all younger branches than the mis-speculated branch. The branch predictor circuitry may further be configured to discard all bits of all identified local branch history registers requiring recovery and set value of each respective recovery counter of all identified local branch history registers requiring recovery to a maximum value for a recovery counter.

In yet another example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a respective branch: (1) set a bit in a corresponding bit-vector indicative of the update of the local branch history register by the respective branch, and (2) set a bit in each of bit-vectors corresponding to all older in-flight branches than the respective branch. The branch predictor circuitry may further be configured to upon a flush, identify all local branch history registers requiring recovery based on a bit-vector corresponding to a mis-speculated branch. The branch predictor circuitry may further be configured to discard all bits of all identified local branch history registers requiring recovery and set value of each respective recovery counter of all identified local branch history registers requiring recovery to a maximum value for a recovery counter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
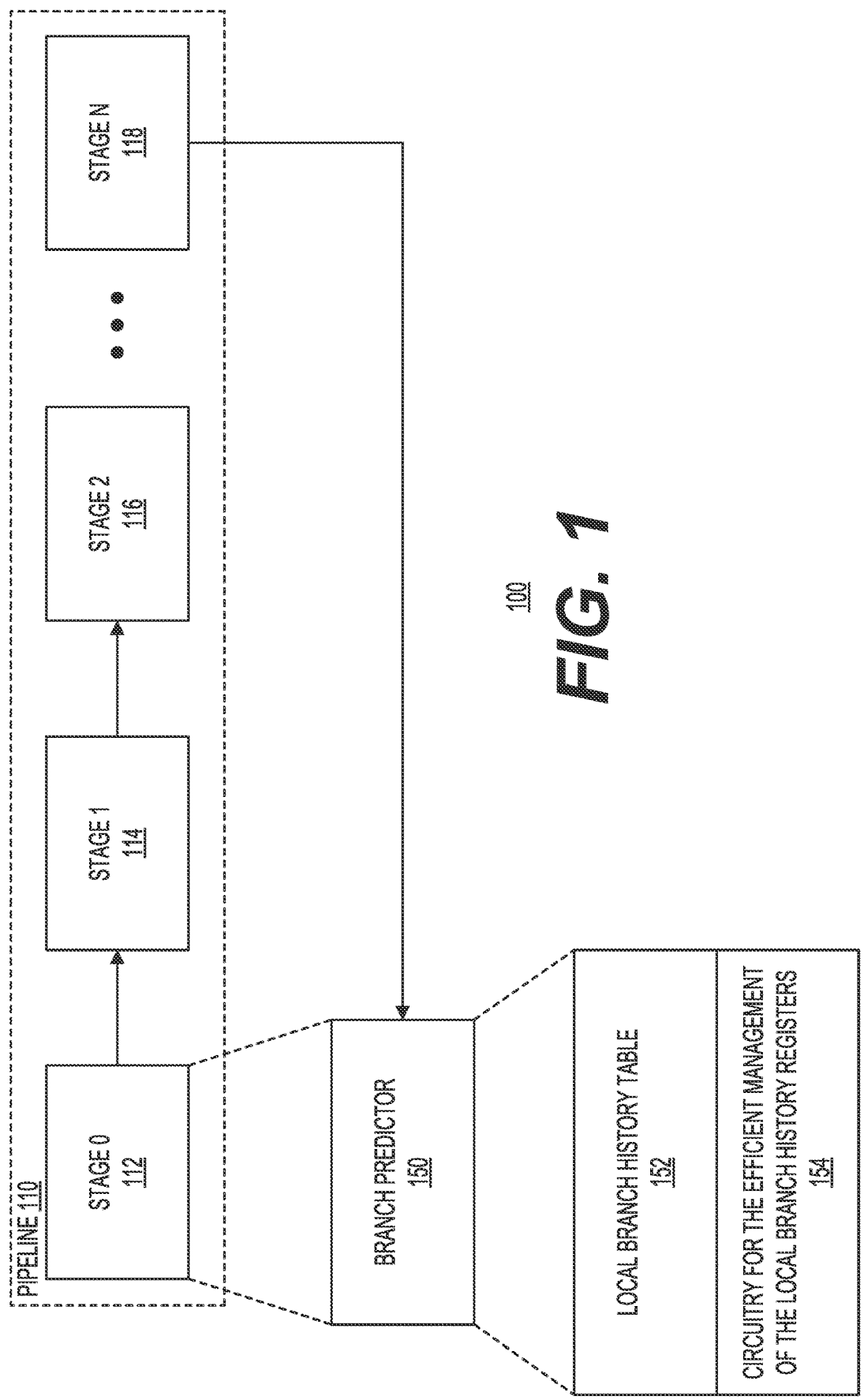
FIG. 1 is a diagram of a processor including a branch predictor with a local branch history table and associated circuitry for efficient management of the local branch history registers in accordance with one example.

Examples described in this disclosure relate to methods and circuitry for efficient management of local branch history registers. As noted earlier, speculative instruction fetching supplies the instructions needed to extract the instruction level parallelism of a program. Successful speculation of next instructions to fetch may depend on a branch predictor's analysis of the program history. Such predictions may turn out to be inaccurate, resulting in the processor having to discard the results of the incorrectly predicted dependences of the instructions and re-execute the instructions in the correct order. In a multi-threaded processor, many threads being executed in parallel may require re-execution of the instructions based on mispredictions.

Despite the risk of misprediction, branch prediction is a performance enhancing microarchitectural feature used in the front-end of many high-performance processors. Upon encountering a branch instruction (e.g., an instruction that changes the program control flow from being sequential to non-sequential), a processor can either stall until the branch is executed to supply the next fetch program counter (PC) or, alternatively, the processor can employ hardware that is capable of predicting the branch outcome ahead of time (before the branch is executed), and then use the predicted outcome to drive instruction fetch. Such hardware is typically referred to as the branch predictor (BP).

Branch predictors may use program history to accurately predict branch outcomes. The prediction made by the branch predictor is then used to steer the instruction fetch unit before the branch is even executed. A branch predictor may correlate on program history by tracking information about the previously executed branches. Program history may be captured using history registers. History registers can be local history registers (e.g., a history register per-branch) or global history registers (e.g., a history register based on the outcome of the last X number of branches). To enhance the prediction, the state of the history registers may be speculatively updated at prediction time (using the predicted branch outcome), such that the next prediction observes the history of all preceding branches (e.g., its predicted using a consistent yet speculative history state.) Because the state is updated speculatively, in case of a mis-speculation, all instructions younger than the mis-predicted branch need to be flushed and the speculatively updated history registers need to be rolled back. This may be achieved by checkpointing information prior to speculatively updating the history registers.

Using local history may improve branch prediction accuracy substantially. However, because a branch predictor may have several local history registers (e.g., 256 registers or even 512 registers), the recovery process from a mis-speculation is complex and slow. One recovery implementation may require walking the list of the flushed branches to reverse the history updates made to the corresponding history registers. Such a process (referred to as the "slow-and-iterative" recovery process) may take an arbitrary number of cycles depending on the number of flushed branches. Another recovery implementation may invalidate all local history registers upon a flush and then let the local history registers get re-populated over time. While this recovery process (referred to as the "invalidate-all" recovery process) may result in a faster recovery, the loss of all local program history significantly affects the accuracy of the branch predictor. In the present disclosure, techniques and structures are described that allow for efficient management of local branch history registers.

FIG. 1 is a diagram of a processor 100 including a branch predictor 150 for efficient management of the local branch history registers in accordance with one example. Processor 100 may be implemented as part of an integrated circuit. Processor 100 may include a pipeline 110 for processing instructions. Pipeline 110 may include multiple stages for processing the instructions in a pipelined fashion. In this example, pipeline 110 may include a stage 0 112, a stage 1 114, a stage 2 116, and a stage N 118, where N is a positive integer. In this example branch predictor 150 may be included in stage 0 112. Branch predictor 150 may be coupled to certain other stages of pipeline 110 depending upon the specific architecture of the processor. In this example, stage 1 114 may be implemented as an instruction cache. Stage 0 112 that includes branch predictor 150 may be configured as a fetch stage. Branch predictor 150 may include hardware that is capable of predicting the branch outcome ahead of time, and then use the predicted outcome to drive the fetching of instructions. Stage 2 116 may be implemented as a decoder configured to decode the next instruction fetched by stage 0 112. Stage N 118 may be implemented as an execute stage for executing the instructions.

With continued reference to FIG. 1, in this example, branch predictor 150 may include a local branch history table 152 and circuitry 154 for the efficient management of the local branch history registers. Circuitry 154 may be implemented using digital logic. As an example, circuitry 154 may include various types of logic gates, registers, counters, multiplexers, finite state machines, combinatorial logic, flip-flops, or other digital logic circuits for implementing the various tasks for branch prediction. Branch predictor 150 may use program history to accurately predict branch outcomes. The prediction made by branch predictor 150 may then be used to steer the instruction fetch process. Branch predictor 150 may correlate on program history by tracking information about the previously executed branches. Program history may be captured using history registers. History registers can be local history registers (e.g., a history register per-branch stored as part of local branch history table 152) or global history registers (e.g., a history register based on the outcome of the last X number of branches). Although FIG. 1 shows a certain number of components of processor 100 arranged in a certain manner, there could be more or fewer number of components arranged differently. As an example, pipeline 110 of processor 100 may include other stages, including stages for implementing a micro-ops morphing logic block, a rename/allocation logic block, an instruction scheduler, and a register file.

FIGS. 2A-2D show training and use of a local branch history register associated with a single branch (branch_A) in accordance with one example. This example focuses on a single branch and its related local branch history register. In this example, local branch history register may include eight bits of history related to a single branch (branch_A). Prior to making a prediction regarding branch_A, the branch predictor (e.g., branch predictor 150 of FIG. 1) may access contents 202 of the local branch history register that is associated with branch_A. Assuming the prediction outcome is branch taken (represented by logic value 1), contents 202 of the local branch history register may be updated to contents 204 (e.g., by shifting the bits in the register to the left and inserting logic 1 as the least significant bit, as shown in FIG. 1). The update may be made soon after the prediction and before the instruction goes through the rest of the pipeline of the processor (e.g., pipeline 110 of processor 100 of FIG. 1).

Figure 2A:
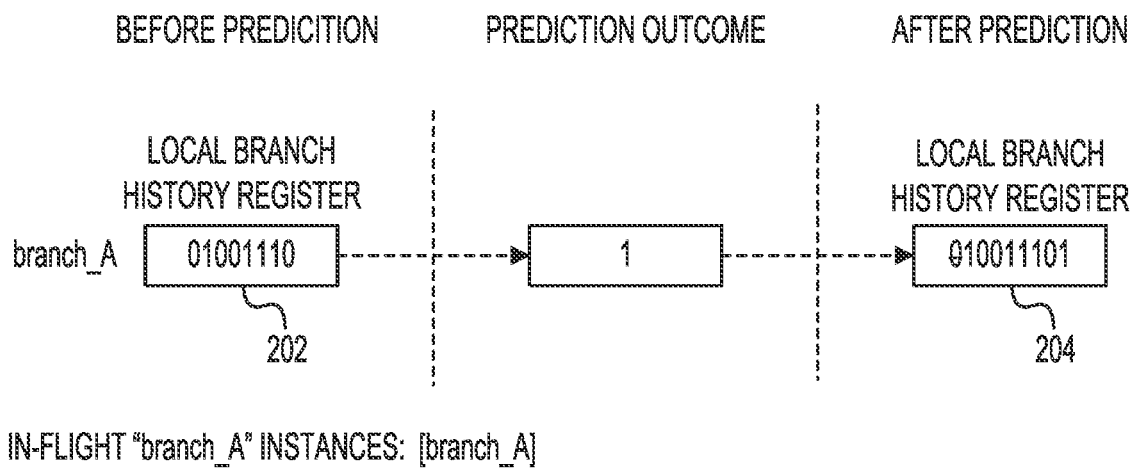
FIGS. 2A-2D show training and use of a local branch history register associated with a single branch in accordance with one example.
Figure 2B:
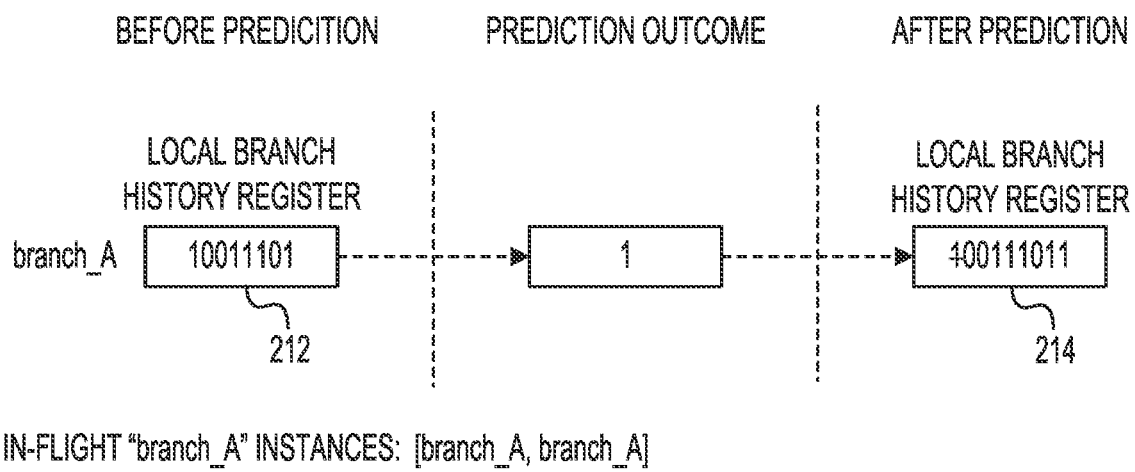

FIG. 2B shows the changes in the contents of the local history register in response to the arrival of another instance of branch_A. Prior to making a prediction regarding the second instance of branch_A, the branch predictor (e.g., branch predictor 150 of FIG. 1) may access contents 212 of the local branch history register that is associated with branch_A. Assuming the prediction outcome is branch taken (represented by logic value 1), contents 212 of the local branch history register may be updated to contents 214 (e.g., by shifting the bits in the register to the left and inserting logic 1 as the least significant bit, as shown in FIG. 1). As before, the update may be made soon after the prediction and before the instruction goes through the rest of the pipeline of the processor (e.g., pipeline 110 of processor 100 of FIG. 1).

Figure 2C:
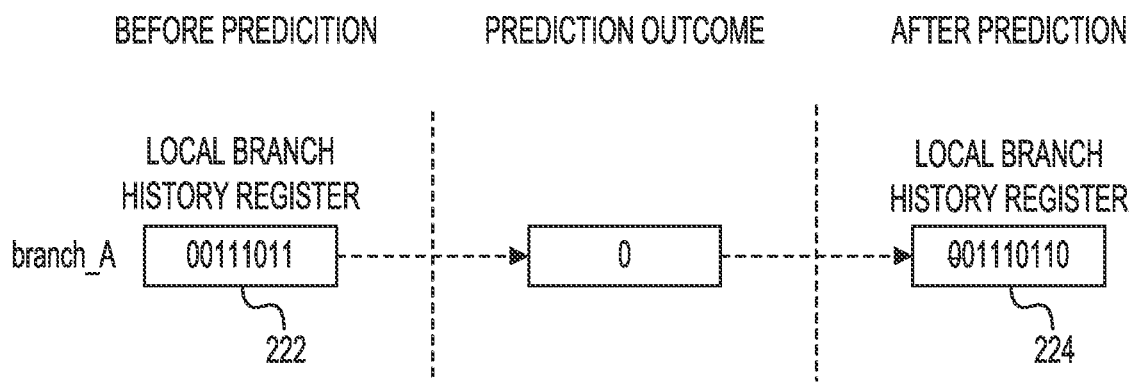

FIG. 2C shows the changes in the contents of the local history register in response to the arrival of yet another instance of branch_A. Prior to making a prediction regarding the third instance of branch_A, the branch predictor (e.g., branch predictor 150 of FIG. 1) may access contents 222 of the local branch history register that is associated with branch_A. Assuming the prediction outcome is branch not-taken (represented by logic value 0), contents 222 of the local branch history register may be updated to contents 224 (e.g., by shifting the bits in the register to the left and inserting logic 0 as the least significant bit, as shown in FIG. 1). As before, the update may be made soon after the prediction and before the instruction goes through the rest of the pipeline of the processor (e.g., pipeline 110 of processor 100 of FIG. 1).

Figure 2D:
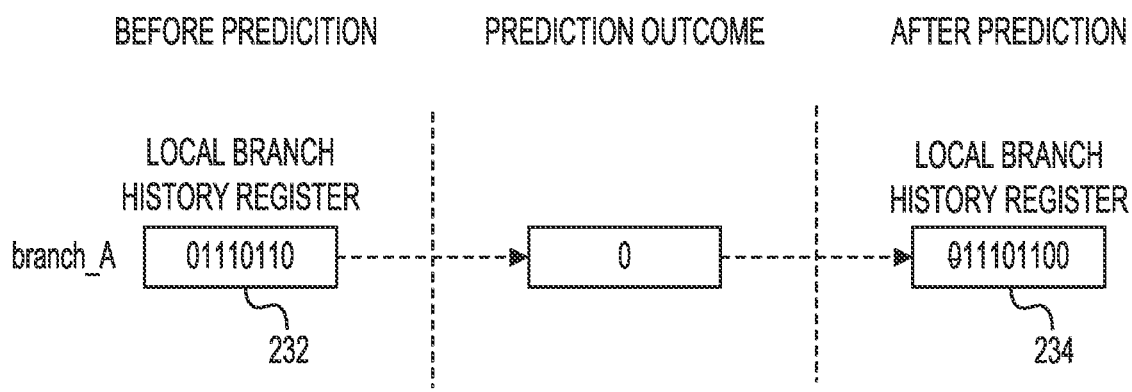

FIG. 2D shows the changes in the contents of the local history register in response to the arrival of yet another instance of branch_A. Prior to making a prediction regarding the fourth instance of branch_A, the branch predictor (e.g., branch predictor 150 of FIG. 1) may access contents 232 of the local branch history register that is associated with branch_A. Assuming the prediction outcome is branch not-taken (represented by logic value 0), contents 232 of the local branch history register may be updated to contents 234 (e.g., by shifting the bits in the register to the left and inserting logic 0 as the least significant bit, as shown in FIG. 1). As before, the update may be made soon after the prediction and before the instruction goes through the rest of the pipeline of the processor (e.g., pipeline 110 of processor 100 of FIG. 1).

Figure 3:
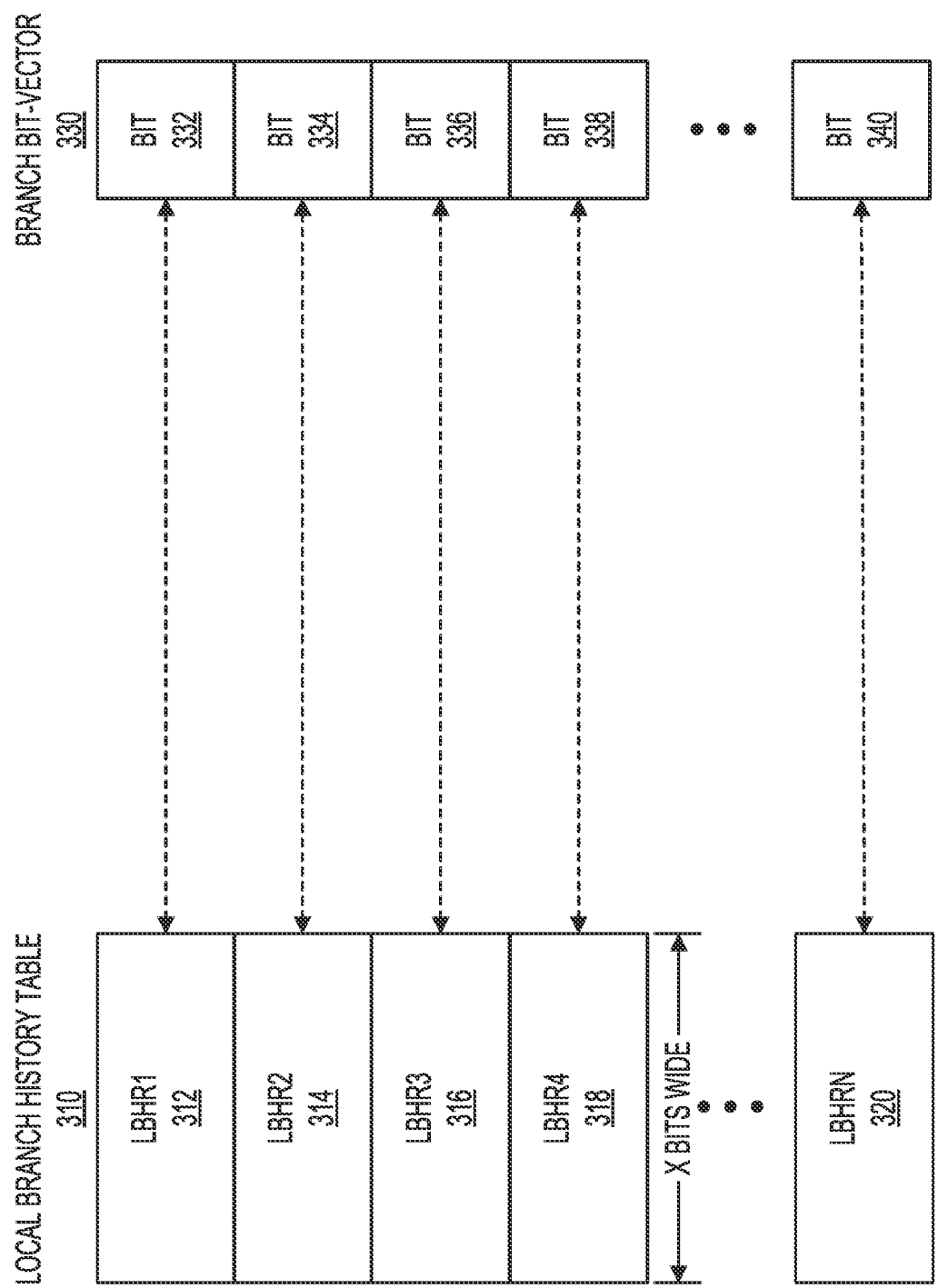
FIG. 3 is a block diagram of local branch history registers and associated circuitry for identifying the registers affected by a flush in accordance with one example.

FIG. 3 is a block diagram of local branch history registers (LBHRs) and associated circuitry for identifying the registers affected by a flush in accordance with one example. Local branch history table 310 may include local branch history registers (one per in-flight branch). Assuming N such in-flight branches, local branch history table 310 may include N local branch history registers (e.g., LBHR1 312, LBHR2 314, LBHR3 316, LBHR4 318, and LBHRN 320). In this example, the associated circuitry for identifying the registers affected by a flush may include a branch bit-vector 330. As used in this disclosure, the term "bit-vector" means any data structure implemented in hardware for storing bits. Hardware structures, such as registers, may be used to implement a bit-vector. In this example, each in-flight branch in the processor pipeline (e.g., pipeline 110 associated with processor 100 of FIG. 1) will have an associated bit-vector. Each bit in the bit-vector corresponds to one local branch history register. In this example, bit 332 corresponds to LBHR1 312, bit 334 corresponds to LBHR2 314, bit 336 corresponds to LBHR3 316, bit 338 corresponds to LBHR4 318, and bit 340 corresponds to LBHRN 320. As an example, branch bit-vector 330 may correspond to a specific in-flight branch (e.g., branch_A described with respect to FIGS. 2A-2D). In this example, when a local branch history register corresponding to a branch is updated (e.g., as described earlier with respect to FIGS. 2A-2D), the branch predictor (e.g., branch predictor 150 of FIG. 1) sets the corresponding bit in the branch's bit-vector. Upon a flush, the branch predictor uses the bit-vectors of the flushing branch (and all younger branches) to identify which local branch history registers need recovery. In this example, if a bit in the bit-vector corresponding to a local branch history register has a logic value 1, indicating that the bit was set by the branch predictor, then that local branch history register and the local branch history registers associated with all younger branches will need recovery. As explained earlier circuitry 154 associated with branch predictor 150 of FIG. 1 may include various types of logic gates, registers, counters, multiplexers, finite state machines, combinatorial logic, flip-flops, or other digital logic circuits for implementing the various tasks for branch prediction, including the management of bit-vectors and local branch history registers.

Figure 4:
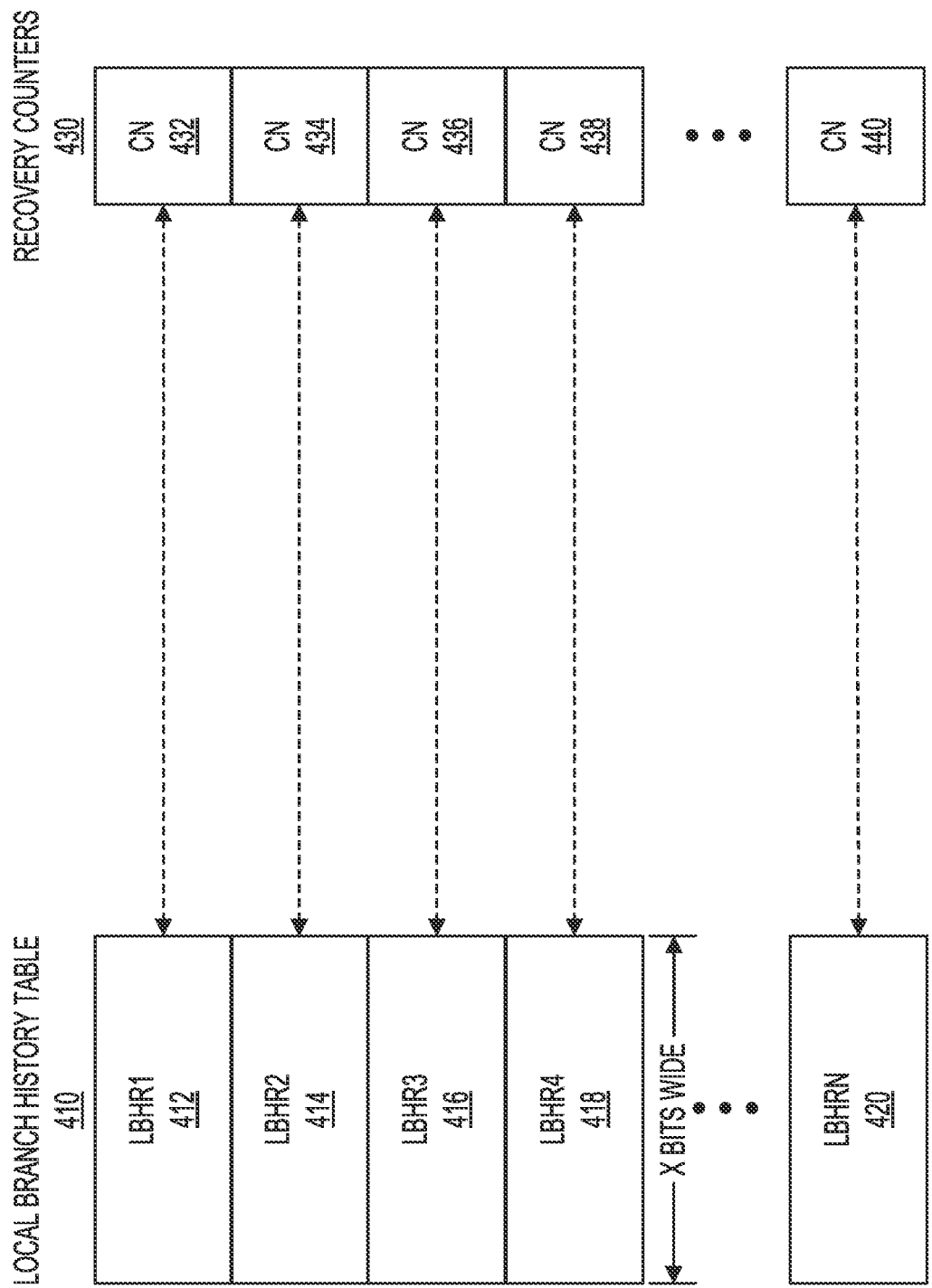
FIG. 4 is a block diagram of local branch history registers and associated circuitry for tracking the validity of a register for participation in branch prediction in accordance with one example.

FIG. 4 is a block diagram of local branch history registers and associated circuitry for tracking the validity of a register for participation in branch prediction in accordance with one example. Local branch history table 410 may include local branch history registers (one per in-flight branch). Assuming N such in-flight branches, local branch history table 410 may include N local branch history registers (e.g., LBHR1 412, LBHR2 414, LBHR3 416, LBHR4 418, and LBHRN 420). In this example, associated circuitry for tracking the validity of a register for participation in branch prediction may include recovery counters 430. In this example, each local branch history register has an associated unsigned recovery counter. In this example, recovery counter C1 432 corresponds to LBHR1 412, recovery counter C2 434 corresponds to LBHR2 314, recovery counter C3 436 corresponds to LBHR3 416, recovery counter C4 438 corresponds to LBHR4 418, and recovery counter CN 440 corresponds to LBHRN 420. Each recovery counter corresponding to a local branch history register indicates the number of bits that need to be re-populated (i.e., recovered) before the local branch history register is valid or ready to participate in the next prediction. Thus, in this example, the maximum value of a recovery counter, and hence its bit width, represents the history length. Regardless of the recovery counter value, the local branch history registers are updated speculatively, as explained earlier. Only if a recovery counter's value is zero can the corresponding local branch history register be used for a branch prediction. Otherwise, the recovery counter is decremented by 1 each time a branch speculatively updates the local history register. As explained earlier circuitry 154 associated with branch predictor 150 of FIG. 1 may include various types of logic gates, registers, counters, multiplexers, finite state machines, combinatorial logic, flip-flops, or other digital logic circuits for implementing the various tasks for branch prediction, including the management of bit-vectors and local branch history registers.

Using the local branch history registers, the associated circuitry for identifying the registers affected by a flush, and the associated circuitry for tracking the validity of a register for participation in branch prediction described earlier, the present disclosure provides different approaches for the efficient management of the local branch history registers. One approach preserves the local branch history registers' stage to allow for a faster recovery. Another approach is simpler, but the recovery of the local branch history registers is slower.

Figure 5:
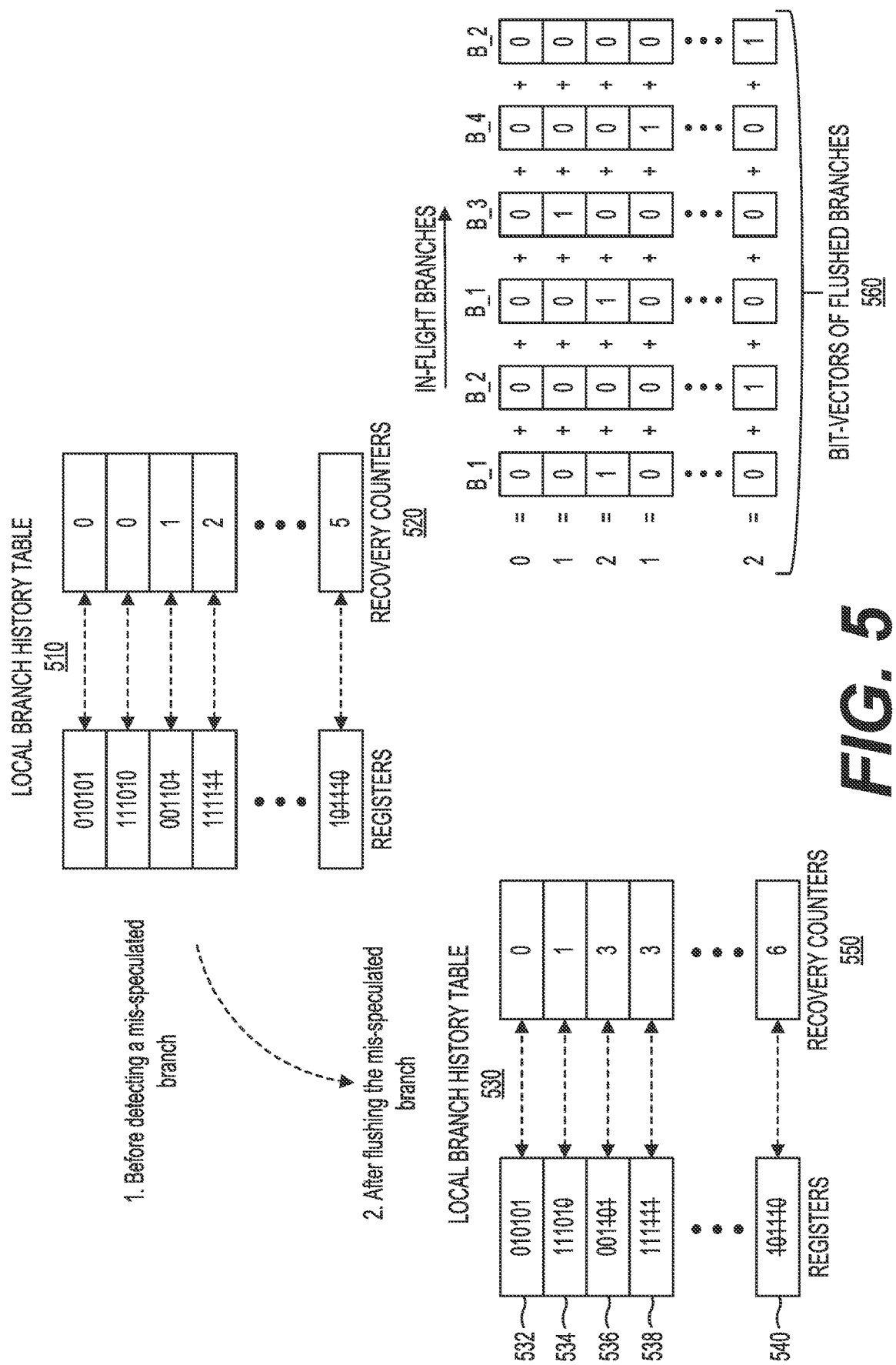
FIG. 5 provides an example of a first approach to recovery that preserves the local branch history registers' stage to allow for a faster recovery.

FIG. 5 provides an example of the first approach to recovery that preserves the local branch history registers' state to allow for a faster recovery. To explain this approach, in one example, local branch history table 510 shows the state of the local branch history registers prior to the detection of a mis-speculated branch requiring a flush. Recovery counters 520 include counters for each of the local branch history tables shown as part of local branch history table 510. This example assumes six in-flight branches (e.g., branches B_1, B_2, B_1, B_3, B_4, and B_2). Local branch history table 530 shows the state of the local branch history registers after the flushing as a result of the mis-speculated branch. Recovery counters 550 include counters for each of the local branch history registers shown as part of local branch history table 530. When a local branch history register is used in the prediction of a branch, the branch predictor sets the corresponding bit in a bit-vector (similar to as explained earlier with respect to FIG. 3) as shown with respect to bit-vectors of the flushed branches 560.

Upon a flush of the in-flight branches (e.g., branches B_1, B_2, B_1, B_3, B_4, and B_2), the precise number of bits that need to be repopulated for each local history register are accounted for by adding up the bit vectors of the flushing branch and all younger branches. The sum of the corresponding bits in the bit vectors, the value for the maximum local history length, and the current corresponding recovery counter values are used to reset the recovery counter for a local branch history register to: amount "A"=min(max_local_hist_length, (sum_of_corresponding_bits_in_all_bit_vectors+corresponding_recovery_counter_current_value)). If a recovery counter's value is set to the local branch history register length (e.g., 6 bits in the example in FIG. the branch predictor invalidates all bits in the corresponding local branch history register. Otherwise, the branch predictor right shifts the affected local branch history registers by the amount "A" calculated earlier. As the branch predictor continues to update these registers (as more branches are predicted), the branch predictor re-enables a given invalidated local branch history register once all its suspect bits have been replaced by new bits (effectively, when the corresponding recovery counter's value reaches zero).

With continued reference to FIG. 5, in this example, the third bit from the top of the bit-vector corresponds to branch B_1 the bottom-most bit of the bit-vector corresponds to branch B_2, the second bit from the top of the bit-vector corresponds to branch B_3, and the further bit from the top of the bit-vector corresponds to branch B_4. Sums of the corresponding bits in the bit-vectors are shown to the left of the bit-vectors. Thus, for this example, table 1 below shows the calculated history length for each of the affected local history registers that needs recovery.

TABLE 1

| Sum of the corresponding bits in all bit-vectors | Current value of the corresponding recovery counter | History length requiring recovery |
| --- | --- | --- |
| 0 | 0 | 0 |
| 1 | 0 | 1 |
| 2 | 1 | 3 |
| 1 | 2 | 3 |
| 2 | 5 | 6 |

Based on the computed amount of the history length that requires recovery, the bits in local branch history table 530 are shown as struck out. As shown in this example, local branch history register 532 does not require any recovery since it was not affected by the flush. Accordingly, the entire history of this register is preserved and local branch history register 532 can be used by the branch predictor in the next prediction cycle. As another example, local branch history register 534 requires the recovery of the least significant bit of the register. The branch predictor right shifts the bits in local branch history register 534 by one bit. The updated recovery count is set to 1 and until that reaches zero, local branch history register 534 is not used by the branch predictor for making any predictions. Notably, however, the remaining bits of local branch history register 534 are preserved. Local branch history register 536 and local branch history register 538 require the recovery of three bits. Accordingly, each of the associated recovery counter's value is updated to three. In each of local branch history register 536 and local branch history register 536, however, three remaining bits are still preserved. As the last example, the recovery counter value corresponding to local branch history register 540 is set to the history register length (6 bits in this example) and all six bits in the register are invalidated by the branch predictor.

As the branch predictor continues to update these registers (as more branches are predicted), the branch predictor re-enables a given invalidated local branch history register once all its suspect bits have been replaced by the new bits (e.g., effectively, when the corresponding recovery counter's value reaches zero). Advantageously, instead of rolling back all of the local branch history registers, which is a slow and expensive process, a more practical approach that offers fast and accurate recovery is used. Moreover, the recovery counters enable a self-healing local branch history rollback process that is performed in the background. This, in turn, upon a mis-speculation, eliminates the need for a complex recovery mechanism or the invalidation of the entire local branch history stored in the local branch history tables.

Figure 6:
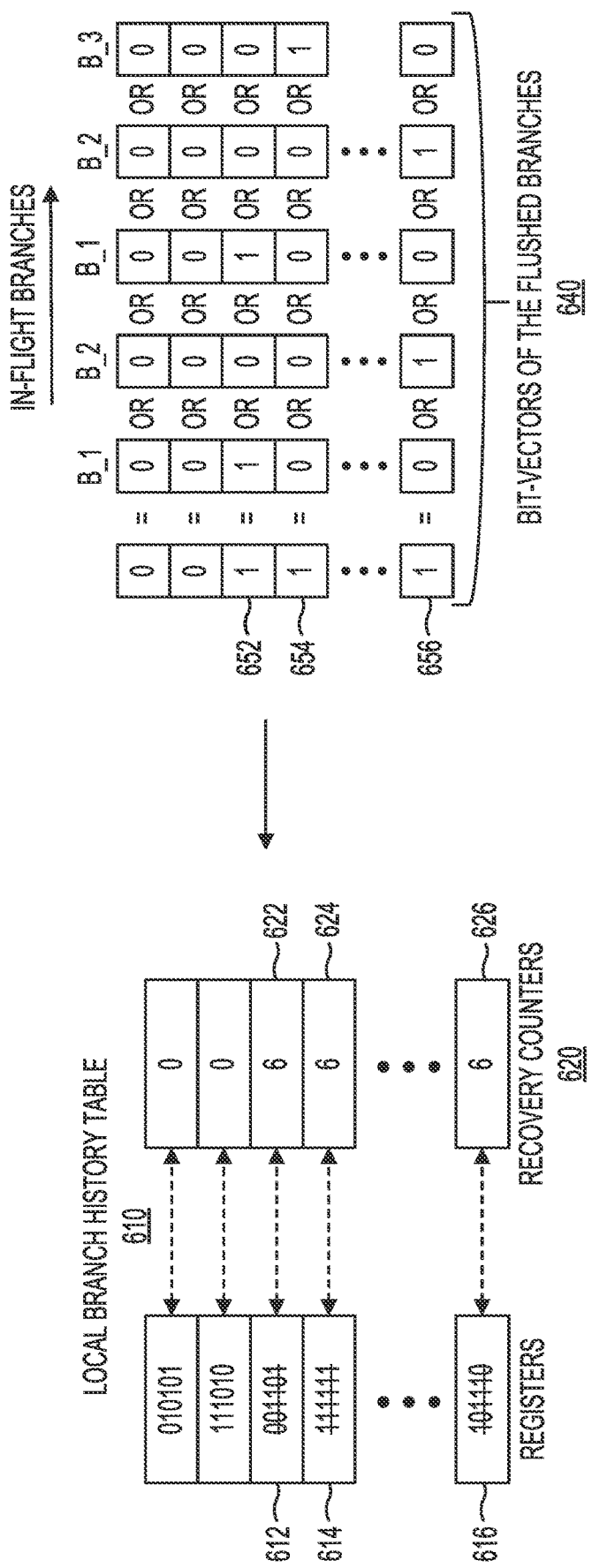
FIG. 6 provides an example of a first implementation of a second approach to recovery.

FIG. 6 provides an example of a first implementation of a second approach to recovery. This implementation of the second approach is simpler to implement than the first approach described with respect to FIG. 5, but the recovery takes longer. To explain this approach local branch history table 610 shows the state of the local branch history registers after the flushing as a result of the mis-speculated branch. This example assumes five in-flight branches (branches B_1, B_2, B_1, B_2, and B_3). Recovery counters 620 include counters for each of the local branch history tables shown as part of local branch history table 610. When a local branch history register is used in the prediction of a branch, the branch predictor sets the corresponding bit in a bit-vector (similar to as explained earlier with respect to FIG. 3) as shown with respect to bit-vectors of the flushed branches 640.

Upon a flush of the in-flight branches (e.g., branches B_1, B_2, B_1, B_2, and B_3), the affected local history registers are identified by performing a logical "OR" operation on the bit-vectors of the flushed branch and all younger branches. The result is a single bit-vector 650 indicating which local history registers need recovery. The branch predictor invalidates any local history register whose corresponding bit is set in bit-vector 650. As shown in FIG. 6, in this example, bit 652, bit 654, and bit 656 of bit-vector 650 are set after performing the logical "OR" operation on the bit-vectors of the flushed branch and all younger branches (e.g., bit-vectors of the flushed branches 640). Accordingly, the branch predictor invalidates local branch history register 612, local branch history register 614, and local branch history register 616. In addition, the branch predictor sets the recovery counter of any invalidated local history register to the maximum possible value for the recovery counter (e.g., the local history register length). As shown in FIG. 6, in this example, the branch predictor sets the value of each of recovery counter 622, recovery counter 624, and recovery counter 626 to 6, which is equal to the bit-width of the local branch history registers shown in FIG. 6. As the branch predictor continues to update these registers (as more branches are predicted), the branch predictor re-enables a given invalidated local branch history register once all its suspect bits have been replaced by new bits (effectively, when the corresponding recovery counter's value reaches zero).

Figure 7:
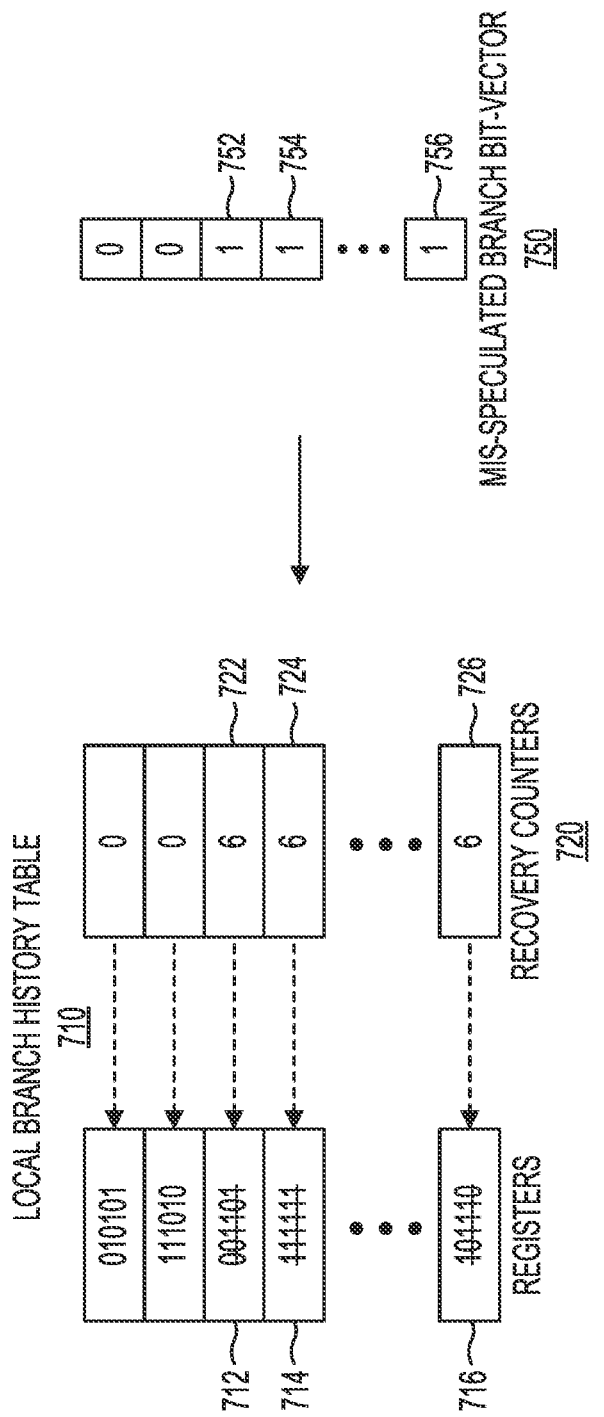
FIG. 7 provides an example of a second implementation of the second approach to recovery.

FIG. 7 provides an example of a second implementation of the second approach to recovery. This implementation of the second approach is also simpler to implement than the first approach described with respect to FIG. 5, but the recovery takes longer. To explain this approach local branch history table 710 shows the state of the local branch history registers after the flushing as a result of the mis-speculated branch. This example also assumes five in-flight branches (branches B_1, B_2, B_1, B_2, and B_3) as shown in FIG. 6. Recovery counters 720 include counters for each of the local branch history tables shown as part of local branch history table 710. Unlike the first implementation of the second approach described with respect to FIG. 6, when a local branch history register is used in the prediction of a branch, the branch predictor sets the corresponding bit in a bit-vector (similar to as explained earlier with respect to FIG. 3) of not only the predicted branch, but also the corresponding bits in all older in-flight branches' bit-vectors. As an example, assuming branch B_3 shown in FIG. 6 is the branch for which a prediction is made, then the branch predictor sets the bits in each of older in-flight branches (e.g., branches B_1, B_2, B_1, and B_2).

Upon a flush of the in-flight branches (e.g., branches B_1, B_2, B_1, B_2, and B_3 shown in FIG. 6), the affected local history registers are identified by examining only the bit-vector (e.g., mis-speculated branch bit-vector 750) associated with the flushed branch. In this example, this single mis-speculated branch bit-vector 750 indicates which local history registers need recovery. The branch predictor invalidates any local history register whose corresponding bit is set in mis-speculated branch bit-vector 750. As shown in FIG. 7, in this example, bit 752, bit 754, and bit 756 of mis-speculated branch bit-vector 750 are set. Accordingly, the branch predictor invalidates local branch history register 712, local branch history register 714, and local branch history register 716. In addition, the branch predictor sets the recovery counter of any invalidated local history register to the maximum possible value for the recovery counter (e.g., the local history register length). As shown in FIG. 7, in this example, the branch predictor sets the value of each of recovery counter 722, recovery counter 724, and recovery counter 726 to 6, which is equal to the bit-width of the local branch history registers shown in FIG. 7. As the branch predictor continues to update these registers (as more branches are predicted), the branch predictor re-enables a given invalidated local branch history register once all its suspect bits have been replaced by new bits (effectively, when the corresponding recovery counter's value reaches zero).

Figure 8:
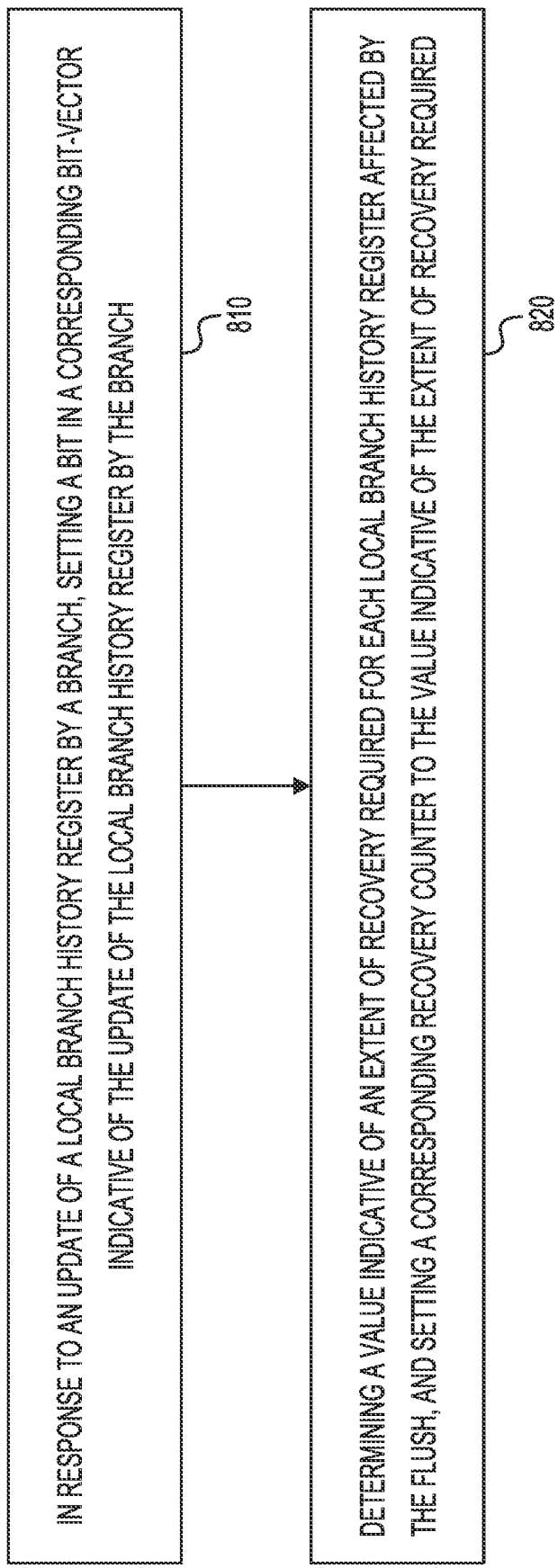
FIG. 8 is a flow chart of a method for efficient management of local branch history registers of the processor of FIG. 1 in accordance with one example.

FIG. 8 is a flow chart 800 of a method for efficient management of local branch history registers of the processor 100 of FIG. 1 in accordance with one example. This method relates to the first approach to recovery (described with respect to FIG. 5) that preserves the local branch history registers' stage to allow for a faster recovery. Each of the steps recited in this method may be performed by a branch predictor circuitry, as described earlier. Step 810 may include in response to an update of a local branch history register by a branch, setting a bit in a corresponding bit-vector indicative of the update of the local branch history register by the branch. As described with respect to FIG. 3 earlier, when a local branch history register corresponding to a branch is updated (e.g., as described earlier with respect to FIGS. 2A-2D), the branch predictor circuitry sets the corresponding bit in the branch's bit-vector.

Step 820 may include upon a flush, determining a value indicative of an extent of recovery required for each local branch history register affected by the flush, and setting a corresponding recovery counter to the value indicative of the extent of recovery required. As described earlier with respect to FIG. 5, the value indicative of an extent of recovery for each local branch history register affected by the flush is determined by the branch predictor circuitry by performing operations comprising: (1) calculate a sum of bits in all bit-vectors associated with the mis-speculated branch and all in-flight branches that are younger than the mis-speculated branch as a respective first value, (2) add the respective first value to a current value of a corresponding recovery counter to determine a respective second value, and (3) determine the value indicative of an extent of recovery for each local branch history register affected by the flush as a minimum of a maximum value of a recovery counter and the respective second value.

Figure 9:
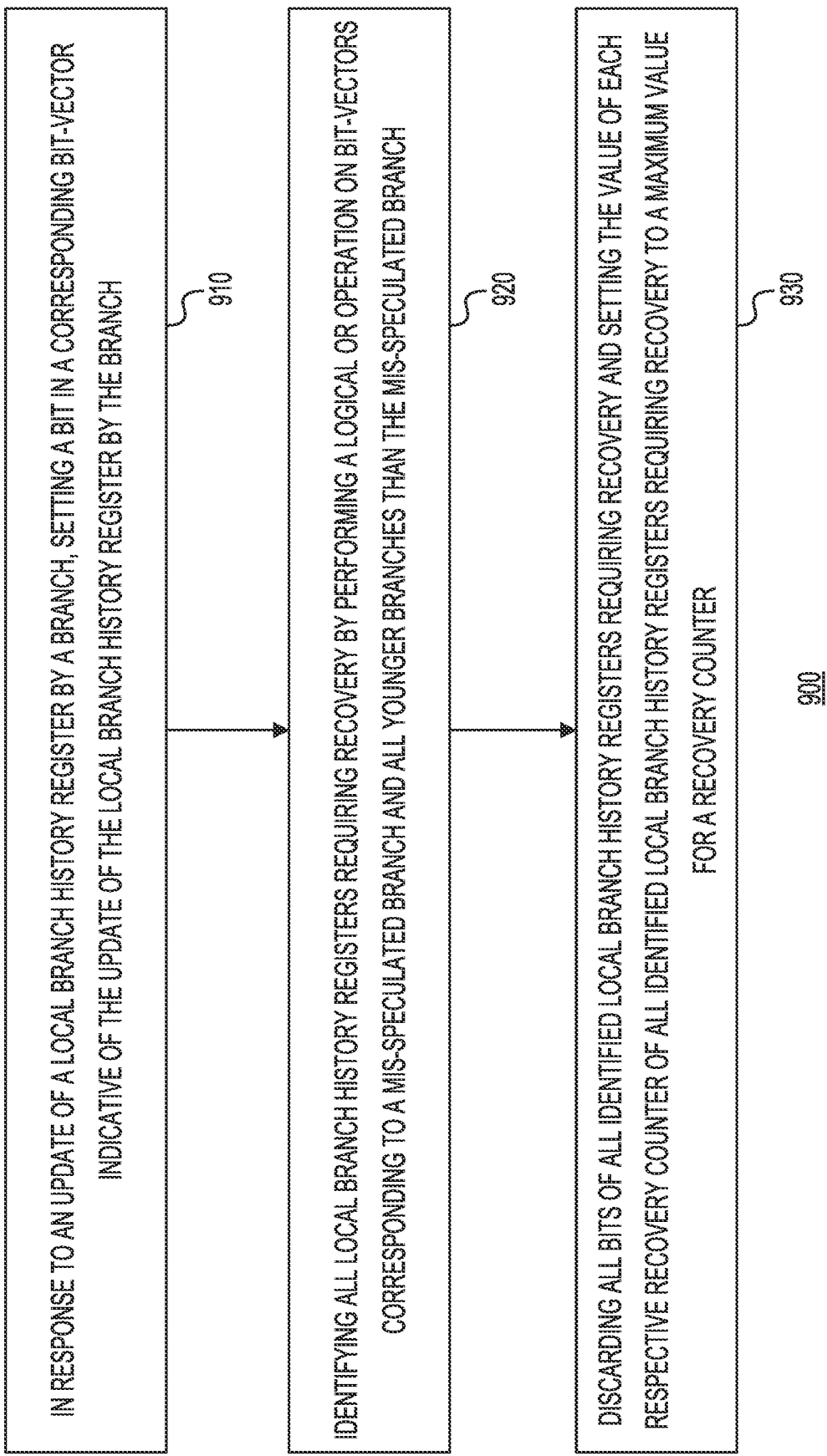
FIG. 9 is a flow chart of another method for efficient management of local branch history registers of the processor of FIG. 1 in accordance with one example.

FIG. 9 is a flow chart of another method for efficient management of local branch history registers of the processor of FIG. 1 in accordance with one example. This method relates to a first implementation of a second approach (described with respect to FIG. 6) to recovery. Each of the steps recited in this method may be performed by a branch predictor circuitry, as described earlier. Step 910 may include in response to an update of a local branch history register by a branch, setting a bit in a corresponding bit-vector indicative of the update of the local branch history register by the branch. As described with respect to FIG. 3 earlier, when a local branch history register corresponding to a branch is updated (e.g., as described earlier with respect to FIGS. 2A-2D), the branch predictor circuitry sets the corresponding bit in the branch's bit-vector.

Step 920 may include upon a flush, identifying all local branch history registers requiring recovery by performing a logical OR operation on bit-vectors corresponding to a mis-speculated branch and all younger branches than the mis-speculated branch. As described earlier with respect to FIG. 6, upon a flush of the in-flight branches (e.g., branches B_1, B_2, B_1, B_2, and B_3), the affected local history registers are identified by performing a logical "OR" operation on the bit-vectors of the flushed branch and all younger branches. The result is a single bit-vector (e.g., bit-vector 650 of FIG. 6) indicating which local history registers need recovery.

Step 930 may include discarding all bits of all identified local branch history registers requiring recovery and setting the value of each respective recovery counter of all identified local branch history registers requiring recovery to a maximum value for a recovery counter. Additional details associated with the discarding of the bits and setting of the recovery counters are provided with respect to FIG. 6. Moreover, as explained earlier, as the branch predictor continues to update these registers (as more branches are predicted), the branch predictor re-enables a given invalidated local branch history register once all its suspect bits have been replaced by new bits (effectively, when the corresponding recovery counter's value reaches zero).

Figure 10:
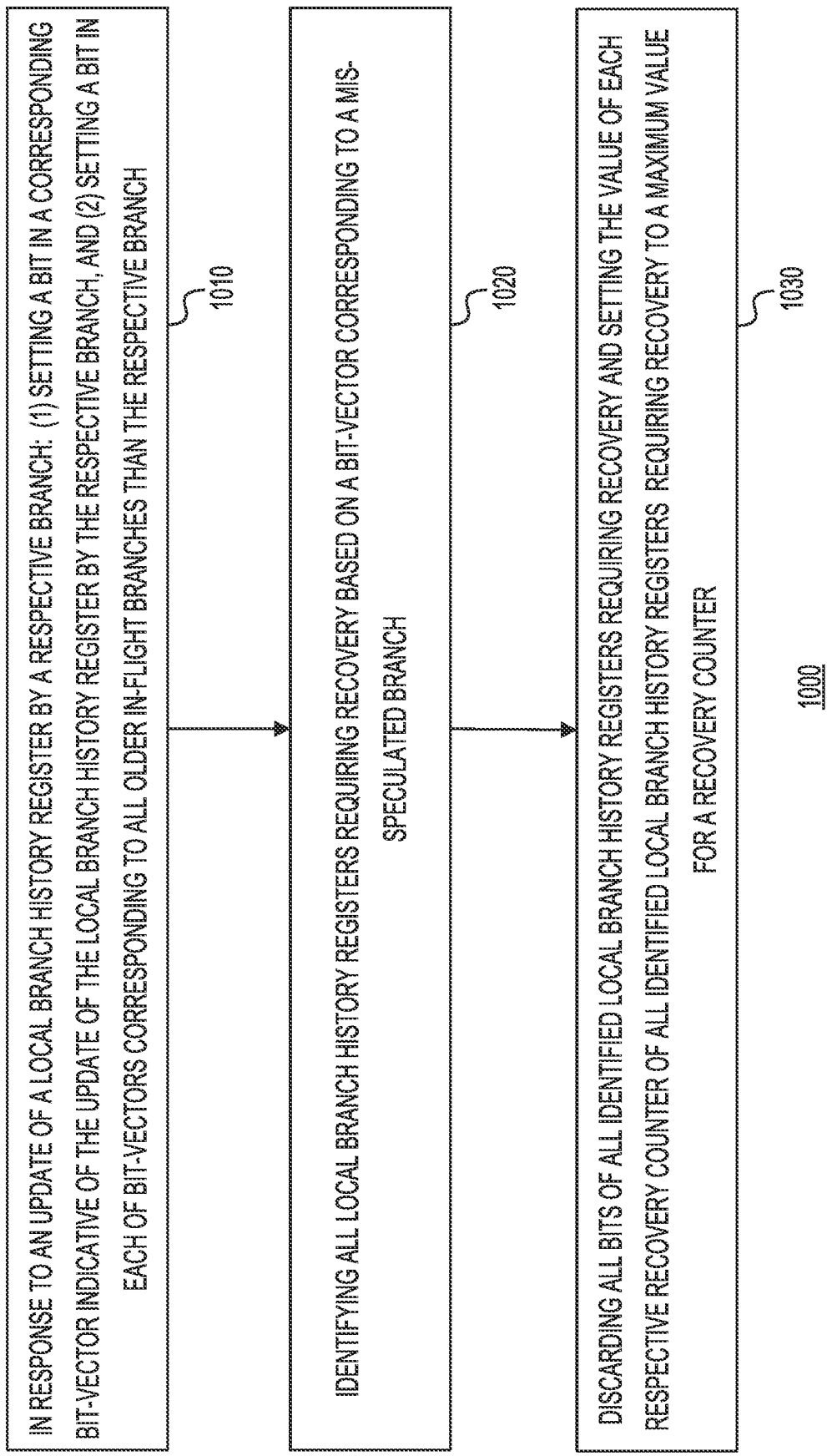
FIG. 10 is a flow chart of yet another method for efficient management of local branch history registers of the processor of FIG. 1 in accordance with one example.

FIG. 10 is a flow chart 1000 of another method for efficient management of local branch history registers a of the processor of FIG. 1 in accordance with one example. This methods relates to a second implementation of a second approach (described with respect to FIG. 7) to recovery. Each of the steps recited in this method may be performed by a branch predictor circuitry, as described earlier. Step 1010 may include in response to an update of a local branch history register by a respective branch: (1) setting a bit in a corresponding bit-vector indicative of the update of the local branch history register by the respective branch, and (2) setting a bit in each of bit-vectors corresponding to all older in-flight branches than the respective branch. As described earlier with respect to FIG. 6, when a local branch history register is used in the prediction of a branch, the branch predictor sets the corresponding bit in a bit-vector (similar to as explained earlier with respect to FIG. 3) of not only the predicted branch, but also the corresponding bits in all older in-flight branches' bit-vectors. As an example, assuming branch B_3 shown in FIG. 6 is the branch for which a prediction is made, then the branch predictor sets the bits in each of older in-flight branches (e.g., branches B_1, B_2, B_1, and B_2 described earlier with respect to FIG. 6).

Step 1020 may include upon a flush, identifying all local branch history registers requiring recovery based on a bit-vector corresponding to a mis-speculated branch. As explained earlier with respect to FIG. 7, upon a flush of the in-flight branches (e.g., branches B_1, B_2, B_1, B_2, and B_3 shown in FIG. 6), the affected local history registers are identified by examining only the bit-vector (e.g., mis-speculated branch bit-vector 750 of FIG. 7) associated with the flushed branch.

Step 1030 may include discarding all bits of all identified local branch history registers requiring recovery and setting value of each respective recovery counter of all identified local branch history registers requiring recovery to a maximum value for a recovery counter. Additional details associated with the discarding of the bits and setting of the recovery counters are provided with respect to FIG. 7. Moreover, as explained earlier, as the branch predictor continues to update these registers (as more branches are predicted), the branch predictor re-enables a given invalidated local branch history register once all its suspect bits have been replaced by new bits (effectively, when the corresponding recovery counter's value reaches zero).

In conclusion, in one example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a branch, set a bit in a corresponding bit-vector indicative of the update of the local branch history register by the branch. The branch predictor circuitry may further be configured to upon a flush, determine a value indicative of an extent of recovery required for each local branch history register affected by the flush, and set a corresponding recovery counter to the value indicative of the extent of recovery required.

The flush may relate to a mis-speculated branch and all in-flight branches that are younger than the mis-speculated branch. The value indicative of an extent of recovery for each local branch history register affected by the flush may be determined by the branch predictor circuitry by performing operations comprising: (1) calculating a sum of bits in all bit-vectors associated with the mis-speculated branch and all in-flight branches that are younger than the mis-speculated branch as a respective first value, (2) adding the respective first value to a current value of a corresponding recovery counter to determine a respective second value, and (3) determining the value indicative of an extent of recovery for each local branch history register affected by the flush as a minimum of a maximum value of a recovery counter and the respective second value.

The branch predictor circuitry may be configured to discard a number of bits equal to the value indicative of the extent of recovery for each local branch history register affected by a flush. The branch predictor circuitry may be configured to discard all bits of a respective local branch history register if the value indicative of an extent of recovery for the respective local branch history register is determined as having the maximum value of the recovery counter. The branch predictor circuitry may be configured to update a respective local branch history register affected by the flush when an additional respective branch is predicted.

The branch predictor circuitry may be configured to decrement a respective recovery counter upon updating the respective local branch history register. The branch predictor circuitry may be configured to re-enable a use of the respective local branch history register once the respective recovery counter is decremented to a value of zero. A respective local branch history register may be used for branch prediction by the branch predictor circuitry only when a corresponding recovery counter's value is zero.

In another example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a branch, set a bit in a corresponding bit-vector indicative of the update of the local branch history register by the branch. The branch predictor circuitry may further be configured to upon a flush, identify all local branch history registers requiring recovery by performing a logical OR operation on bit-vectors corresponding to a mis-speculated branch and all younger branches than the mis-speculated branch. The branch predictor circuitry may further be configured to discard all bits of all identified local branch history registers requiring recovery and set value of each respective recovery counter of all identified local branch history registers requiring recovery to a maximum value for a recovery counter.

The branch predictor circuitry may be configured to update a respective local branch history register affected by a flush when an additional respective branch is predicted. The branch predictor circuitry may be configured to decrement a respective recovery counter upon updating the respective local branch history register.

The branch predictor circuitry may be configured to re-enable a use of the respective local branch history register once the respective recovery counter is decremented to a value of zero. A respective local branch history register may be used for branch prediction by the branch predictor circuitry only when a corresponding recovery counter's value is zero.

In yet another example, the present disclosure relates to a processor including a pipeline comprising a plurality of stages. The processor may further include a bit-vector associated with each of in-flight branches associated with the pipeline, where each bit-vector has a bit corresponding to each local branch history register associated with a respective in-flight branch. The processor may further include a recovery counter associated with each local branch history register for tracking a number of bits needing recovery before a local branch history register is valid for participation in branch prediction.

The processor may further include branch predictor circuitry configured to in response to an update of a local branch history register by a respective branch: (1) set a bit in a corresponding bit-vector indicative of the update of the local branch history register by the respective branch, and (2) set a bit in each of bit-vectors corresponding to all older in-flight branches than the respective branch. The branch predictor circuitry may further be configured to upon a flush, identify all local branch history registers requiring recovery based on a bit-vector corresponding to a mis-speculated branch. The branch predictor circuitry may further be configured to discard all bits of all identified local branch history registers requiring recovery and set value of each respective recovery counter of all identified local branch history registers requiring recovery to a maximum value for a recovery counter.

The branch predictor circuitry may be configured to update a respective local branch history register affected by a flush when an additional respective branch is predicted. The branch predictor circuitry may be configured to decrement a respective recovery counter upon updating the respective local branch history register. The branch predictor circuitry may be configured to re-enable a use of the respective local branch history register once the respective recovery counter is decremented to a value of zero.

A respective local branch history register may be used for branch prediction by the branch predictor circuitry only when a corresponding recovery counter's value is zero. The plurality of stages may include a fetch stage and the branch predictor circuitry may be included in the fetch stage.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, or the component B may be a sub-component of the component A.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for managing local branch history registers of a processor including a pipeline comprising a plurality of stages, the method comprising:
    providing a bit-vector associated with each of in-flight branches associated with the pipeline, wherein each bit-vector having a bit corresponding to each local branch history register associated with a respective in-flight branch;
    providing a recovery counter associated with each local branch history register for tracking a number of bits needing recovery before a local branch history register is valid for participation in branch prediction;
    in response to an update of a local branch history register by a branch, setting a bit in a corresponding bit-vector indicative of the update of the local branch history register by the branch; and
    upon a flush, determining a value indicative of an extent of recovery required for each local branch history register affected by the flush, and setting a corresponding recovery counter to the value indicative of the extent of recovery required.

2. The method of claim 1, wherein the flush relates to a mis-speculated branch and all in-flight branches that are younger than the mis-speculated branch.

3. The method of claim 2, wherein the value indicative of an extent of recovery for each local branch history register affected by the flush is determined by a branch predictor circuitry by performing operations comprising:
    calculating a sum of bits in all bit-vectors associated with the mis-speculated branch and all in-flight branches that are younger than the mis-speculated branch as a respective first value,
    adding the respective first value to a current value of a corresponding recovery counter to determine a respective second value, and
    determining the value indicative of an extent of recovery for each local branch history register affected by the flush as a minimum of a maximum value of a recovery counter and the respective second value.

4. The method of claim 3, further comprising discarding a number of bits equal to the value indicative of the extent of recovery for each local branch history register affected by the flush.

5. The method of claim 3, further comprising discarding all bits of a respective local branch history register if the value indicative of an extent of recovery for the respective local branch history register is determined as having the maximum value of the recovery counter.

6. The method of claim 4, further comprising updating a respective local branch history register affected by the flush when an additional respective branch is predicted.

7. The method of claim 6, further comprising decrementing a respective recovery counter upon updating the respective local branch history register.

8. The method of claim 7, further comprising re-enabling a use of the respective local branch history register once the respective recovery counter is decremented to a value of zero.

9. The method of claim 1, wherein a respective local branch history register can be used for branch prediction by a branch predictor circuitry only when a corresponding recovery counter's value is zero.

10. A method for managing local branch history registers of a processor including a pipeline comprising a plurality of stages, the method comprising:
    providing a bit-vector associated with each of in-flight branches associated with the pipeline, wherein each bit-vector having a bit corresponding to each local branch history register associated with a respective in-flight branch;
    providing a recovery counter associated with each local branch history register for tracking a number of bits needing recovery before a local branch history register is valid for participation in branch prediction;
    in response to an update of a local branch history register by a branch, setting a bit in a corresponding bit-vector indicative of the update of the local branch history register by the branch;
    upon a flush, identifying all local branch history registers requiring recovery by performing a logical OR operation on bit-vectors corresponding to a mis-speculated branch and all younger branches than the mis-speculated branch; and
    discarding all bits of all identified local branch history registers requiring recovery and setting a value of each respective recovery counter of all identified local branch history registers requiring recovery to a maximum value for a recovery counter.

11. The method of claim 10, further comprising updating a respective local branch history register affected by a flush when an additional respective branch is predicted.

12. The method of claim 11, further comprising decrementing a respective recovery counter upon updating the respective local branch history register.

13. The method of claim 12, further comprising re-enabling a use of the respective local branch history register once the respective recovery counter is decremented to a value of zero.

14. The method of claim 10, wherein a respective local branch history register can be used for branch prediction by a branch predictor circuitry only when a corresponding recovery counter's value is zero.

15. A method for managing local branch history registers of a processor including a pipeline comprising a plurality of stages, the method comprising:

providing a bit-vector associated with each of in-flight branches associated with the pipeline, wherein each bit-vector having a bit corresponding to each local branch history register associated with a respective in-flight branch;

providing a recovery counter associated with each local branch history register for tracking a number of bits needing recovery before a local branch history register is valid for participation in branch prediction;

in response to an update of a local branch history register by a respective branch: (1) setting a bit in a corresponding bit-vector indicative of the update of the local branch history register by the respective branch, and (2) setting a bit in each of bit-vectors corresponding to all older in-flight branches than the respective branch;

upon a flush, identifying all local branch history registers requiring recovery based on a bit-vector corresponding to a mis-speculated branch; and discarding all bits of all identified local branch history registers requiring recovery and setting a value of each respective recovery counter of all identified local branch history registers requiring recovery to a maximum value for a recovery counter.

16. The method of claim 15, further comprising updating a respective local branch history register affected by a flush when an additional respective branch is predicted.

17. The method of claim 16, further comprising decrementing a respective recovery counter upon updating the respective local branch history register.

18. The method of claim 17, further comprising re-enabling a use of the respective local branch history register once the respective recovery counter is decremented to a value of zero.

19. The method of claim 15, wherein a respective local branch history register can be used for branch prediction by a branch predictor circuitry included in the processor only when a corresponding recovery counter's value is zero.

20. The method of claim 19, wherein the plurality of stages includes a fetch stage, and wherein the branch predictor circuitry is included in the fetch stage.

* * * * *